(12) United States Patent
Eskelinen

(10) Patent No.: US 12,538,171 B2
(45) Date of Patent: Jan. 27, 2026

(54) TCP ACK RATE REDUCTION IN MOBILE COMMUNICATIONS

(71) Applicant: MediaTek Singapore Pte. Ltd., Singapore (SG)

(72) Inventor: Jarkko Eskelinen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 353 days.

(21) Appl. No.: 18/247,319

(22) PCT Filed: Oct. 8, 2021

(86) PCT No.: PCT/CN2021/122562
§ 371 (c)(1),
(2) Date: Mar. 30, 2023

(87) PCT Pub. No.: WO2022/073473
PCT Pub. Date: Apr. 14, 2022

(65) Prior Publication Data
US 2024/0007899 A1    Jan. 4, 2024

Related U.S. Application Data

(60) Provisional application No. 63/087,937, filed on Oct. 6, 2020.

(51) Int. Cl.
*H04W 28/06* (2009.01)
*H04L 1/1829* (2023.01)
(Continued)

(52) U.S. Cl.
CPC ........... *H04W 28/06* (2013.01); *H04L 1/1854* (2013.01); *H04L 1/1887* (2013.01); *H04W 28/0268* (2013.01); *H04W 80/02* (2013.01)

(58) Field of Classification Search
CPC . H04W 28/0268; H04W 28/06; H04W 80/02; H04L 1/1854; H04L 1/1887
See application file for complete search history.

(56) References Cited

U.S. PATENT DOCUMENTS

| | | |
|---|---|---|
| 9,264,940 B2 | 2/2016 | Liu et al. |
| 10,652,147 B2 | 5/2020 | Makineni et al. |

(Continued)

FOREIGN PATENT DOCUMENTS

| | | |
|---|---|---|
| CN | 1964362 A | 5/2007 |
| CN | 102300256 A | 12/2011 |

(Continued)

OTHER PUBLICATIONS

International Search Report and Written Opinion dated Jan. 6, 2022, issued in application No. PCT/CN2021/122562.

(Continued)

*Primary Examiner* — Syed Ali
(74) *Attorney, Agent, or Firm* — McClure, Qualey & Rodack, LLP

(57) ABSTRACT

Various solutions for Transmission Control Protocol (TCP) acknowledgement (ACK) rate reduction in mobile communications are described. A processor of an apparatus compresses a plurality of source TCP ACKs into compressed TCP ACKs. The processor then transmits the compressed TCP ACKs in a Packet Data Convergence Protocol (PDCP) data protocol data unit (PDU) to a receiver.

16 Claims, 9 Drawing Sheets

(51) Int. Cl.
  *H04L 1/1867* (2023.01)
  *H04W 28/02* (2009.01)
  *H04W 80/02* (2009.01)

(56) References Cited

U.S. PATENT DOCUMENTS

| | | | |
|---|---|---|---|
| 10,869,224 | B2 | 12/2020 | Zhao et al. |
| 11,606,717 | B2* | 3/2023 | Joseph .................. H04L 1/1812 |
| 2010/0189059 | A1 | 7/2010 | Yang |
| 2016/0381598 | A1 | 12/2016 | Chan |
| 2017/0223578 | A1 | 8/2017 | Hong |
| 2017/0311362 | A1 | 10/2017 | Hong |
| 2018/0077605 | A1 | 3/2018 | Maheshwari et al. |
| 2018/0124642 | A1 | 5/2018 | Phuyal |
| 2018/0213461 | A1 | 7/2018 | Grayson |
| 2018/0368021 | A1 | 12/2018 | Jung |
| 2019/0149638 | A1 | 5/2019 | Desai et al. |
| 2019/0174449 | A1 | 6/2019 | Shan |
| 2019/0280826 | A1 | 9/2019 | Yi |
| 2019/0306884 | A1 | 10/2019 | Palat |
| 2019/0313271 | A1 | 10/2019 | Yiu |
| 2020/0044792 | A1* | 2/2020 | Vaidya .................... H04L 47/34 |
| 2020/0077470 | A1 | 3/2020 | Xiong et al. |
| 2020/0275311 | A1* | 8/2020 | Zhao .................... H04W 28/06 |
| 2021/0006376 | A1* | 1/2021 | Cirik .................... H04L 1/1861 |
| 2021/0227579 | A1* | 7/2021 | Lee .......................... H04W 4/40 |
| 2021/0250808 | A1* | 8/2021 | Mitra .................... H04W 28/02 |
| 2021/0282050 | A1* | 9/2021 | Adjakple .............. H04L 1/1874 |
| 2022/0225163 | A1* | 7/2022 | Sharma .................... H04L 69/22 |
| 2022/0225428 | A1 | 7/2022 | Xiong |
| 2022/0286929 | A1* | 9/2022 | Park .................. H04W 36/0055 |
| 2022/0338227 | A1* | 10/2022 | Cirik ...................... H04W 72/23 |
| 2023/0070783 | A1* | 3/2023 | Hui ...................... H04W 72/044 |
| 2023/0362883 | A1* | 11/2023 | Park ...................... H04B 7/0617 |

FOREIGN PATENT DOCUMENTS

| | | |
|---|---|---|
| CN | 102427446 A | 4/2012 |
| CN | 104812006 A | 7/2015 |
| CN | 106255153 A | 12/2016 |
| CN | 108696900 A | 10/2018 |
| CN | 110622451 A | 12/2019 |
| CN | 110945909 A | 3/2020 |
| WO | 2019/193154 A1 | 10/2019 |

OTHER PUBLICATIONS

International Search Report and Written Opinion dated Dec. 30, 2021, issued in application No. PCT/CN2021/122212.
Qualcomm Incorporated; "Further details of RLC protocol without concatenation;" 3GPP TSG-RAN WG2 Meeting #96 R2-168603; Nov. 2016; pp. 1-3.
Notice of Allowance dated Oct. 15, 2025, issued in U.S. Appl. No, 18/247,123.

* cited by examiner

TCP ACK RATE REDUCTION IN MOBILE COMMUNICATIONS

CROSS REFERENCE TO RELATED PATENT APPLICATION

The present disclosure is part of a non-provisional application claiming the priority benefit of U.S. Patent Application No. 63/087,937, filed on 6 Oct. 2020, the content of which being incorporated by reference in its entirety.

TECHNICAL FIELD

The present disclosure is generally related to mobile communications and, more particularly, to techniques for Transmission Control Protocol (TCP) acknowledgement (ACK) rate reduction in mobile communications.

BACKGROUND

Unless otherwise indicated herein, approaches described in this section are not prior art to the claims listed below and are not admitted as prior art by inclusion in this section.

The $3^{rd}$ Generation Partnership Project (3GPP) Technical Specification (TS) 38.323 in Chapter 6.1.1 specifies that a Packet Data Convergence Protocol (PDCP) data PDU may contain, in addition to a PDU header, one or more of the following: user plane data, control plane data, and a Message Authentication Code-Integrity (MAC-I). Moreover, Chapter 6.2.2 of the 3GPP TS 38.323 does not propose any means to transport multiple Service Data Adaptation Protocol (SDAP) service data units (SDUs) in one PDCP PDU. Specifically, Chapter 6 of the 3GPP TS 37.324 does not specify a way to transport multiple SDAP SDUs in one SDAP PDU. A TCP ACK is a TCP header with an ACK flag set. In an event that TCP ACK does not carry any data, it is an empty TCP ACK.

There is a one-to-one mapping between certain protocols, including: Internet Protocol (IP) packet from an upper layer (e.g., upper layer SDU) to PDCP SDAP SDU, PDCP SDAP SDU to PDCP SDAP data PDU, PDCP SDU to PDCP PDU, and PDCP PDU to Radio Link Control (RLC) SDU. When the size of an IP packet is small, such as a TCP ACK with less than 100 bytes, the one-to-one mapping tends to result in high SDU/PDU rates in TCP, User Datagram Protocol (UDP), IP, SDAP, PDCP and RLC layers of protocol. The same issue may also occur on network-side peer entities and generally any layer processing packet-based data. Overhead related to transmission, receiving, synchronizing and processing per SDU/PDU tends to become dominant when the amount of data per SDU/PDU decreases (e.g., less payload but more header information). TCP ACK is an extreme example, where the amount of payload data is zero while the header size is 40 bytes for IP version 4 (IPv4).

The ratio of TCP reverse link TCP ACK packet to TCP forward link TCP data packet is ½ (e.g., one TCP ACK for every second TCP data packet), and this is due to delayed ACK algorithm specified in Request for Comments (RFC) 1122. For 100 Mbps TCP data forward flow with 1400-byte maximum transfer unit (MTU) with around 9000 TCP data packets per second, approximately 4500 reverse TCP ACK would be sent. While 40 to 60 bytes of ACK data (in IPv4) may not be much, the rate of such ACK flow can become high due to the fact that downlink data rate is high. The ratio of TCP data to ACK throughput can be about 20. For 100 Mbps forward TCP data, there would be 5 Mbps of reverse flow ACK traffic. The issue of TCP ACK rate could be worsened by the fact that a number of TCP ACKs get buffered in a user equipment (UE) before the network grants uplink resource(s) for uplink transmission. When the grant is received by the UE, the UE needs to fill the grant with TCP ACKs, thereby resulting in MTU/ACK size=1400 bytes/40 bytes=35 times higher packet rate compared to regular TCP data using MTU-size packets. Therefore, there is a need for a solution to reduce TCP ACK rate in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for TCP ACK rate reduction in mobile communications.

In one aspect, a method may involve a processor compressing a plurality of source TCP ACKs into compressed TCP ACKs. The method may also involve the processor transmitting the compressed TCP ACKs in a PDCP data PDU to a receiver.

In another aspect, a method may involve a processor receiving compressed TCP ACKs in a PDCP data PDU from a transmitter. The method may also involve the processor decompressing the compressed TCP ACKs into a plurality of target TCP ACKs.

In yet another aspect, an apparatus may include a transceiver and a processor coupled to the transceiver. The transceiver may be configured to wirelessly communicate with a network. The processor may be configured to compress a plurality of source TCP ACKs into compressed TCP ACKs. The processor may also be configured to transmit, via the transceiver, the compressed TCP ACKs in a PDCP data PDU to a receiver.

It is noteworthy that, although description provided herein may be in the context of certain radio access technologies, networks and network topologies such as $5^{th}$ Generation (5G) New Radio (NR) mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to TCP ACK rate reduction in mobile communications. According to the present disclosure, a number of possible solutions may be implemented separately or jointly. That is, although these possible solutions may be described below separately, two or more of these possible solutions may be implemented in one combination or another.

Figure 1:
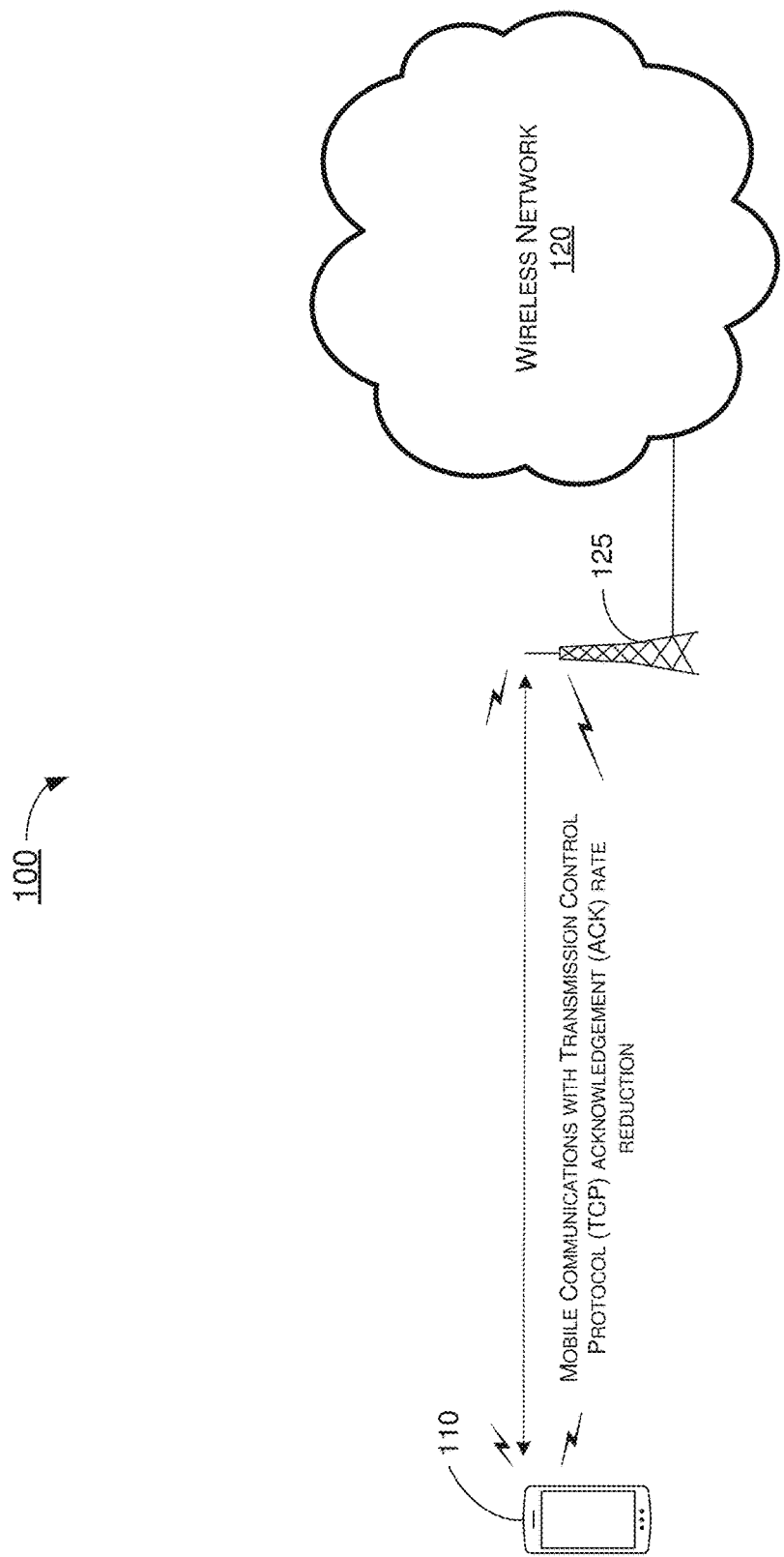
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network or another type of network such as a non-terrestrial network (NTN)). UE 110 may be in wireless communication with wireless network 120 via a base station or network node 125 (e.g., an eNB, gNB, transmit-receive point (TRP) or satellite). In network environment 100, UE 110 and wireless network 120 may implement various schemes pertaining to TCP ACK rate reduction in mobile communications, as described below.

Under a proposed scheme in accordance with the present disclosure, multiple consecutive TCP ACK messages (herein interchangeably referred to as "TCP ACKs") related to a given TCP flow may be transferred or transmitted in a compressed format. This may involve various proposed schemes, as described more in detail below, including: compression of the TCP ACKs, decompression of the TCP ACKs, a format of the compressed TCP ACKs, transfer or transmission of compressed TCP ACKs over a normal PDCP data protocol data unit (PDU), transfer or transmission of a TCP ACK flow descriptor over a PDCP data PDU when uplink data compression (UDC) is active, and transfer or transmission of compressed TCP ACKs over a SDAP PDU in compressed TCP ACKs over IP or in compressed TCP ACKs over TCP.

Under a proposed scheme with respect to compression of multiple consecutive TCP ACKs, the compression of multiple TCP Acks may utilize the cumulative property of TCP ACKs. Specifically, sequence numbers for acknowledgements are cumulative in that consecutive TCP ACKs have one common field that changes. That common field is the 'Acknowledgement' field in the TCP header which is used to indicate a next byte expected to receive. There may also be other fields that change and thus require synchronization. It is noteworthy that the "consecutive" nature of the multiple consecutive TCP ACKs to be compressed is based on multiple ACK messages resulting from reception of a TCP data flow which is identified by a 5-tuple (e.g., source address, destination address, their respective port numbers, and protocol), with part of the 5-tuple or some other similar feature(s) providing means to uniquely identify the TCP data flow.

Under the proposed scheme, compression of multiple consecutive TCP ACKs may involve several stages. At a first stage, a sender (e.g., UE 110) may identify TCP ACKs related to a given TCP flow by a 5-tuple match of a source address, a destination address, a source port number, a destination port number, and a protocol (e.g., TCP). At a second stage, the sender may check whether the ACKs contain data. In an event that the ACKs contain data, the sender may stop compressing the ACKs and, instead, may send a whole TCP packet with data (as TCP ACK is now piggybacked with data and hence there is no need for compression). Otherwise, at a third stage, the sender may check whether a TCP ACK flag is set in the TCP ACKs. In an event that the flags have changed, the sender may stop compression and, instead, may send the ACKs as-is to keep a TCP connection in synchronization. For instance, the sender may forward compressed ACK messages first before forwarding non-compressed ACK messages. At a fourth stage, the sender may send to a receiver (e.g., network node 125) a last or first TCP ACK in a compression buffer as a template ACK as a whole. The template ACK may be the last or first ACK from a stream of consecutive ACK flow that can be found from the compression buffer. At a fifth stage, the sender may drop all other ACKs except the template ACK. At a sixth stage, the sender may create a descriptor of the ACK flow to allow the receiver to regenerate the compressed TCP ACKs. For instance, the descriptor may indicate a number or quantity of TCP ACKs to be regenerated, a start ACK sequence number, a stop ACK sequence number, and a sequence number stride. Accordingly, the receiver may know from the template ACK what the last or first sequence number is.

Figure 2:
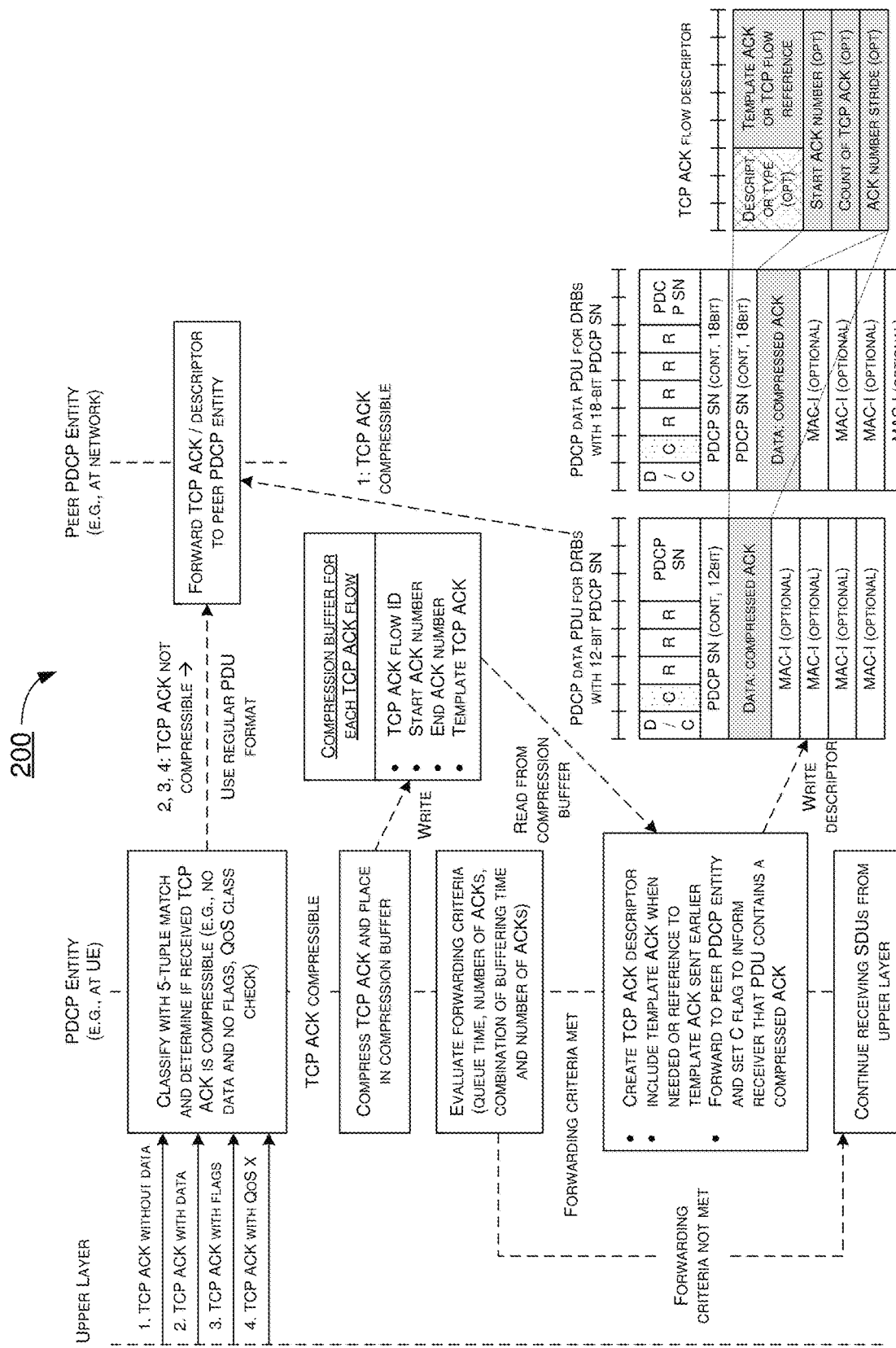
FIG. 2 is a diagram of an example scenario under a proposed scheme in accordance with the present disclosure.

FIG. 2 illustrates an example scenario 200 of TCP ACK compression under the proposed scheme. Referring to FIG. 2, a PDCP entity at UE 110 may receive from upper layer(s)

various TCP ACK flows each having one or more TCP ACKs. The various TCP ACK flows may include: (1) a TCP ACK flow without data, (2) a TCP ACK flow with data, (3) a TCP ACK flow with flags, and (4) a TCP ACK flow with quality of service (QoS) X. The PDCP entity may classify each received TCP ACK flow with a 5-tuple match and determine whether the received TCP ACK flow is compressible. For instance, a received TCP ACK flow is deemed compressible in case it contains no data, carries no flags, and/or passes QoS class check. In an event that the received TCP ACK flow is compressible, the PDCP entity may compress TCP ACKs of that flow and place or otherwise write the compressed TCP ACKs in a compression buffer. In the compression buffer, each compressed TCP ACK flow may be associated with a TCP ACK flow identifier (ID), a start ACK number, an end ACK number, and a template TCP ACK. Additionally, the PDCP entity may evaluate whether certain forwarding criteria are met. The forwarding criteria may pertain to a queue time, a number of ACKs, and a combination of buffering time and number of ACKs. In an event that the forwarding criteria are not met, the PDCP entity may continue to receive SDUs from upper layer(s). In an event that the forwarding criteria are met, the PDCP entity may perform certain operations. For instance, the PDCP entity may create a TCP ACK descriptor for the TCP ACK flow to be forwarded. Moreover, the PDCP entity may generate and include a template ACK when needed or may reference to an existing template ACK sent to a receiver previously. Furthermore, the PDCP entity may forward the compressed TCP ACK flow and TCP ACK descriptor in a PDU to a peer PDCP entity (e.g., at network node 125) and set a C flag to inform the peer PDCP entity that the PDU contains one or more compressed ACKs.

Under the proposed scheme with respect to compression of multiple consecutive TCP ACKs, the amount of TCP ACK data may be reduced by only sending static information about the ACK flow. That is, the sender may send the static information once at the beginning of the ACK flow or at a specified rate. For instance, the sender may send the template ACK only once or after every $N^{th}$ ACK. Moreover, instead of sending the 5-tuple information, the sender may reference to related TCP data flow in the forward direction known by the receiver of compressed ACKs. Under the proposed scheme, the sender may only send variable fields of the TCP ACK header needed by the receiver to reconstruct the ACK flow. The variable fields may include, for example and without limitation, acknowledgement number, sequence number of sender data, flags, window size, checksum, and option fields. Alternatively, the sender may indicate only those changed variable fields to the receiver. Still alternatively, the sender may only indicate to the receiver the amount of change in the variable fields.

Under a proposed scheme with respect to decompression of compressed TCP ACKs, a receiver or a decompressor may restore the compressed TCP ACK stream using a compressed ACK received from a peer. At a first stage, the receiver may use the template ACK and descriptor to calculate or otherwise determine how many TCP ACKs are to be regenerated or reconstructed. At a second stage, the receiver may regenerate the TCP ACKs by copying the template ACK and set respective sequence numbers of the regenerated TCP ACKs according to the descriptor. At a third stage, the receiver may calculate a cyclic redundancy check (CRC) for the regenerated TCP ACKs.

Under a proposed scheme with respect to the TCP ACK flow descriptor, a 'TCP ACK flow descriptor type' field may be utilized to indicate that received data is 'TCP ACK flow descriptor'. Optionally, the 'TCP ACK flow descriptor type' field may also indicate the exact type of TCP ACK flow (e.g., IPv4 or IPv6). In case that a PDCP entity is for IP data, the first 4 bits in the TCP ACK data field may always have the same values and may contain 'IP header' and 'IP version'. The first 4 bits may be set to value 0 or some other suitable value that does not overlap with values in use currently or by a future version of IP. The receiver may know this is not IP packet and may check further bits of the 'descriptor type' field to resolve actual packet type. The 'descriptor type' field may be compliant with UDC header and thus the field may be used to indicate to a decompressor that the packet is TCP ACK flow descriptor. This may allow a UDC decompressor to regenerate TCP ACK. Under the proposed scheme, the descriptor may also include a 'Template ACK' or 'TCP ACK flow reference' field (e.g., length=1~n octets) that is associated to a related TCP data flow or template ACK sent earlier to allow the receiver to regenerate the TCP ACK flow, with n being a positive integer. The descriptor may also include a 'Start Acknowledge number' field (e.g., length=1~n octets) to inform the receiver of the value in the last or first ACK message. The count of TCP ACKs compressed may also be indicated in the descriptor to allow the receiver to generate a correct number of TCP ACKs. This may also take a length of 1~n octets. Still optionally, the descriptor may indicate the acknowledgement number stride to allow the receiver to advance Acknowledge number in generating TCP ACKs one stride at a time. This may take a length of n bits. Moreover, the length of the 'TCP ACK flow descriptor' field may be set according to the number of compressed TCP ACKs and other parameters.

Figure 3:
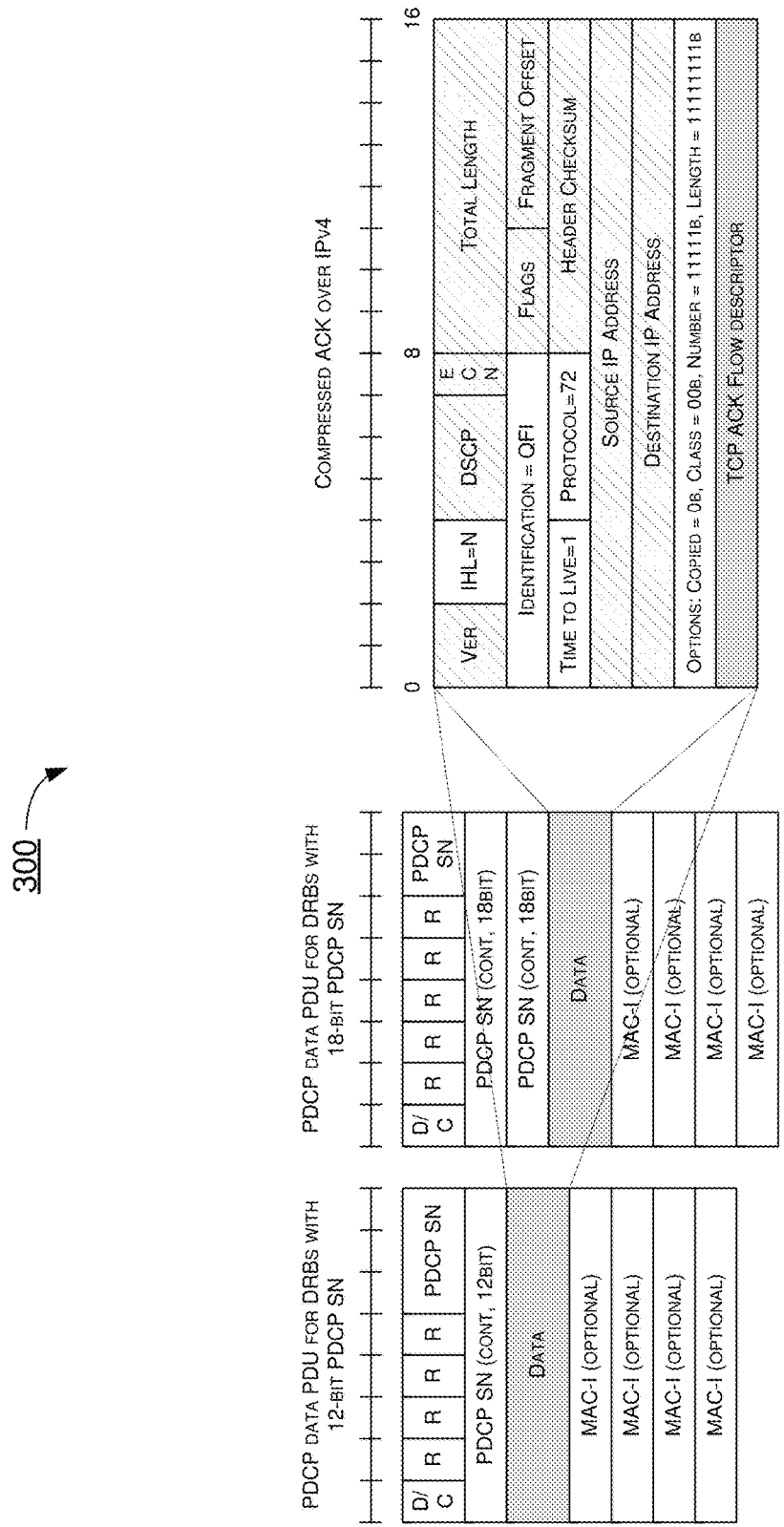
FIG. 3 is a diagram of an example design under a proposed scheme in accordance with the present disclosure.

FIG. 3 illustrates an example design 300 of a compressed ACK over IPv4 with a TCP ACK flow descriptor under the proposed scheme. Under the proposed scheme, an IPv4 header may be used to carry the 'TCP ACK flow descriptor' to indicate that the TCP ACK flow is compressed at the IP (transport) layer. The receiver may know that the IP header contains a 'TCP ACK flow descriptor' based on the Options field header or additionally from the value of the Protocol field. Alternatively, or additionally, the receiver may know that the IP header contains a 'TCP ACK flow descriptor' when the TCK ACK flow descriptor is included in the Options field. Alternatively, or additionally, the receiver may know that the IP header contains a 'TCP ACK flow descriptor' when the value of Internet Header Length (IHL) is set according to the length of the Options field.

Figure 4:
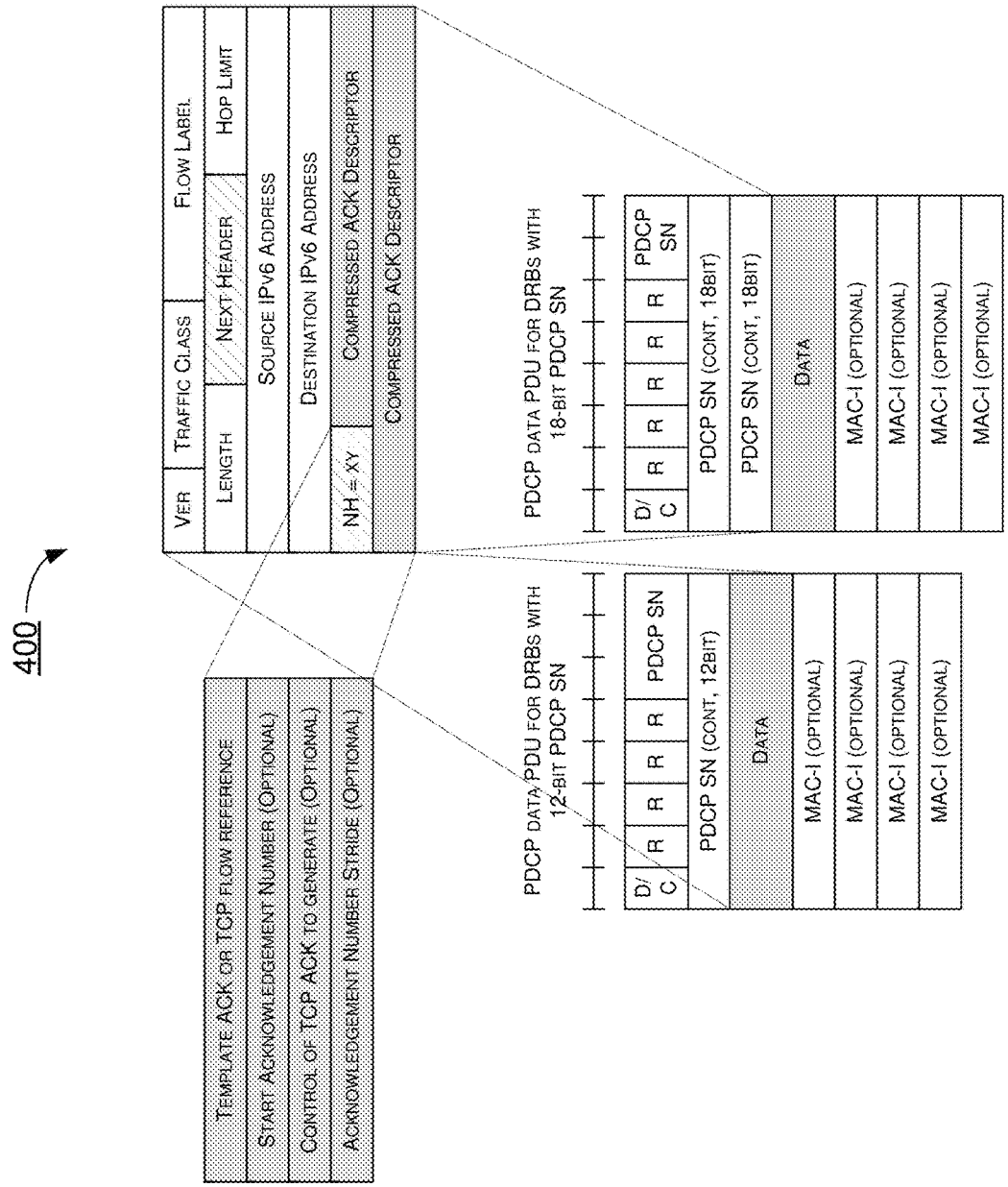
FIG. 4 is a diagram of an example design under a proposed scheme in accordance with the present disclosure.

FIG. 4 illustrates an example design 400 of a compressed ACK over IPv6 with a TCP ACK flow descriptor under the proposed scheme. Under the proposed scheme, an IPv6 'Next Hop' header may be utilized to carry a 'TCP ACK flow descriptor' to indicate that the TCP ACK flow is compressed at the IP (transport) layer. The receiver may know that the IP header contains a 'TCP ACK flow descriptor' by checking whether any of the attached next-hop (NH) headers is or contains the 'TCP ACK flow descriptor'. Under the proposed scheme, an IPv6 header may contain multiple TCP ACK descriptors in separate NH headers.

Figure 5:
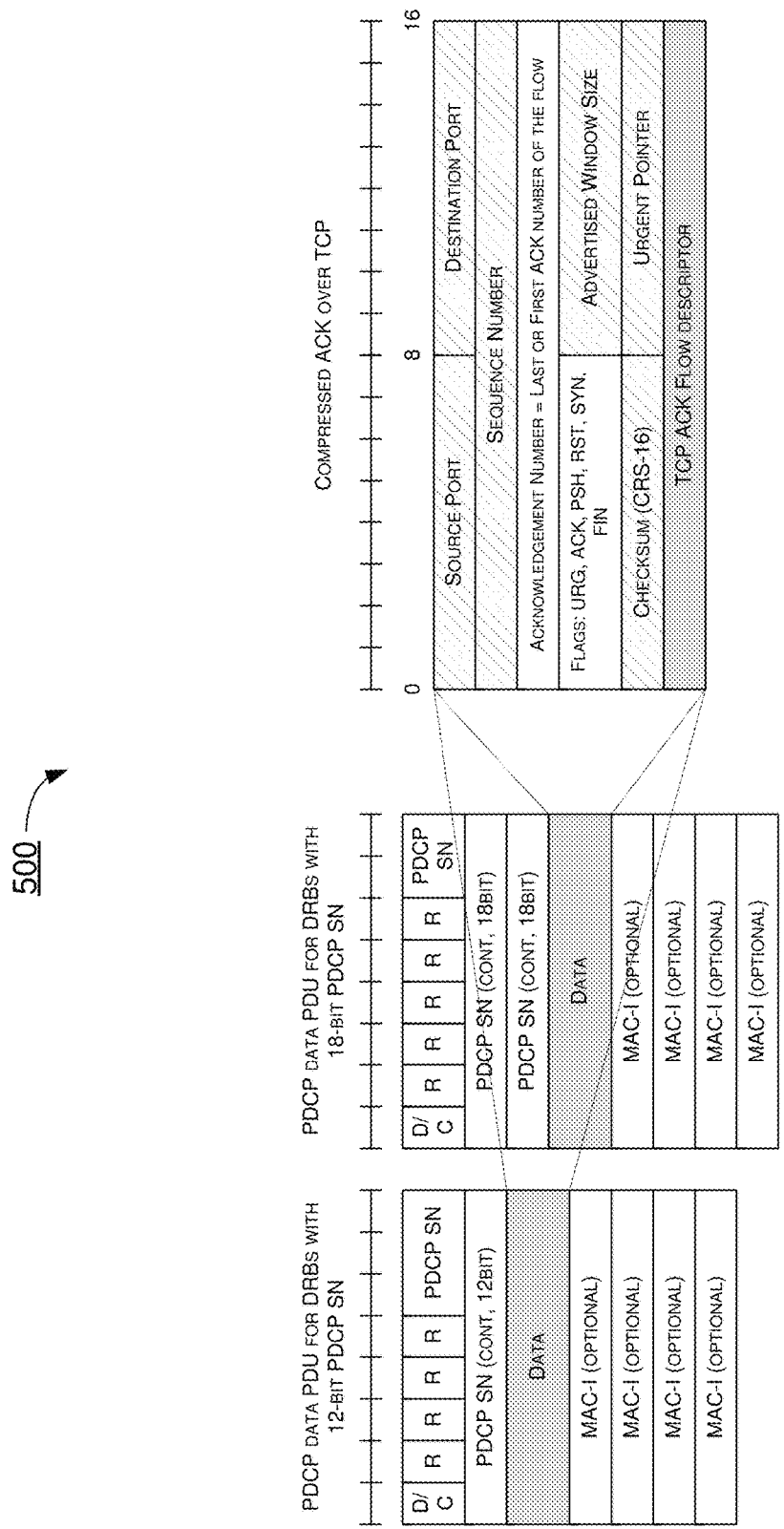
FIG. 5 is a diagram of an example design under a proposed scheme in accordance with the present disclosure.

FIG. 5 illustrates an example design 500 of a compressed ACK over TCP with a TCP ACK flow descriptor under the proposed scheme. Under the proposed scheme, a TCP header option field may be used to carry the 'TCP ACK flow descriptor' to indicate that the TCP ACK flow is compressed at the TCP layer. The receiver may identify TCP ACKs with 'TCP ACK flow descriptor' by checking the contents of the ACK field and Options field. Moreover, PDCP data PDU may be as-is but a flag in a first octet of the PDU may be set to inform the receiver that the received PDU contains compressed TCP ACK.

Figure 6:
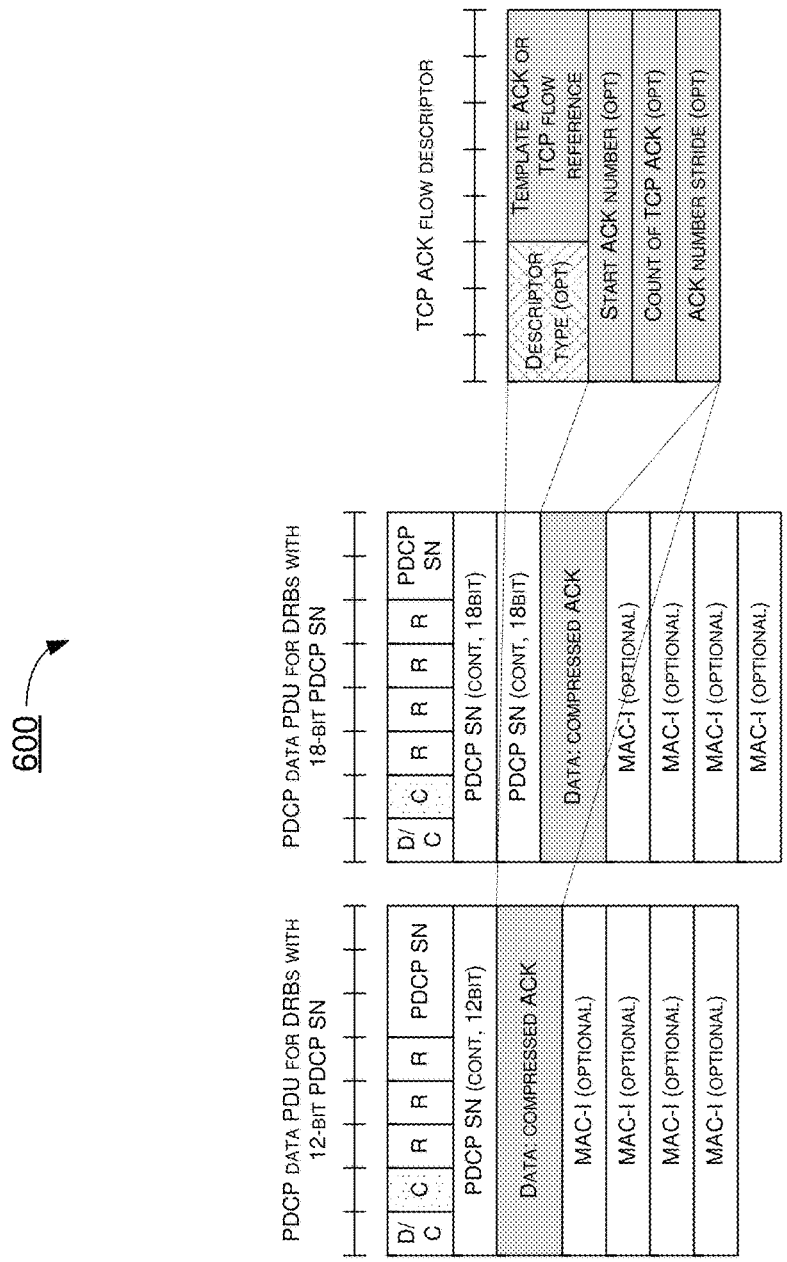
FIG. 6 is a diagram of an example design under a proposed scheme in accordance with the present disclosure.

FIG. 6 illustrates an example design 700 under a proposed scheme with respect to transfer or transmission of a TCP ACK flow descriptor over a PDCU data PDU. Under the proposed scheme, a new 'C' flag may be added to the 'PDCP data PDU' header by using one of the R (reserved) fields to inform the receiver that the data fields contains the TCP ACK flow descriptor. Additionally, the use of compressed ACKs in the data field may be negotiated with a peer PDCP entity. Under the proposed scheme, when UDC is active, the data field may have a UDC header when a 'PDCP data PDU' entity is configured to use UDC. A new 'C' bit may be added to the header to inform a UDC compressor so that the UDC compressor may identify compressed TCP ACK packets. The 'TCP ACK flow descriptor' and 'descriptor type' field may be compliant with the UDC header to inform the UDC decompressor on how to decompress TCP ACKs indicated by the 'TCP ACK flow descriptor'.

Illustrative Implementations

Figure 7:
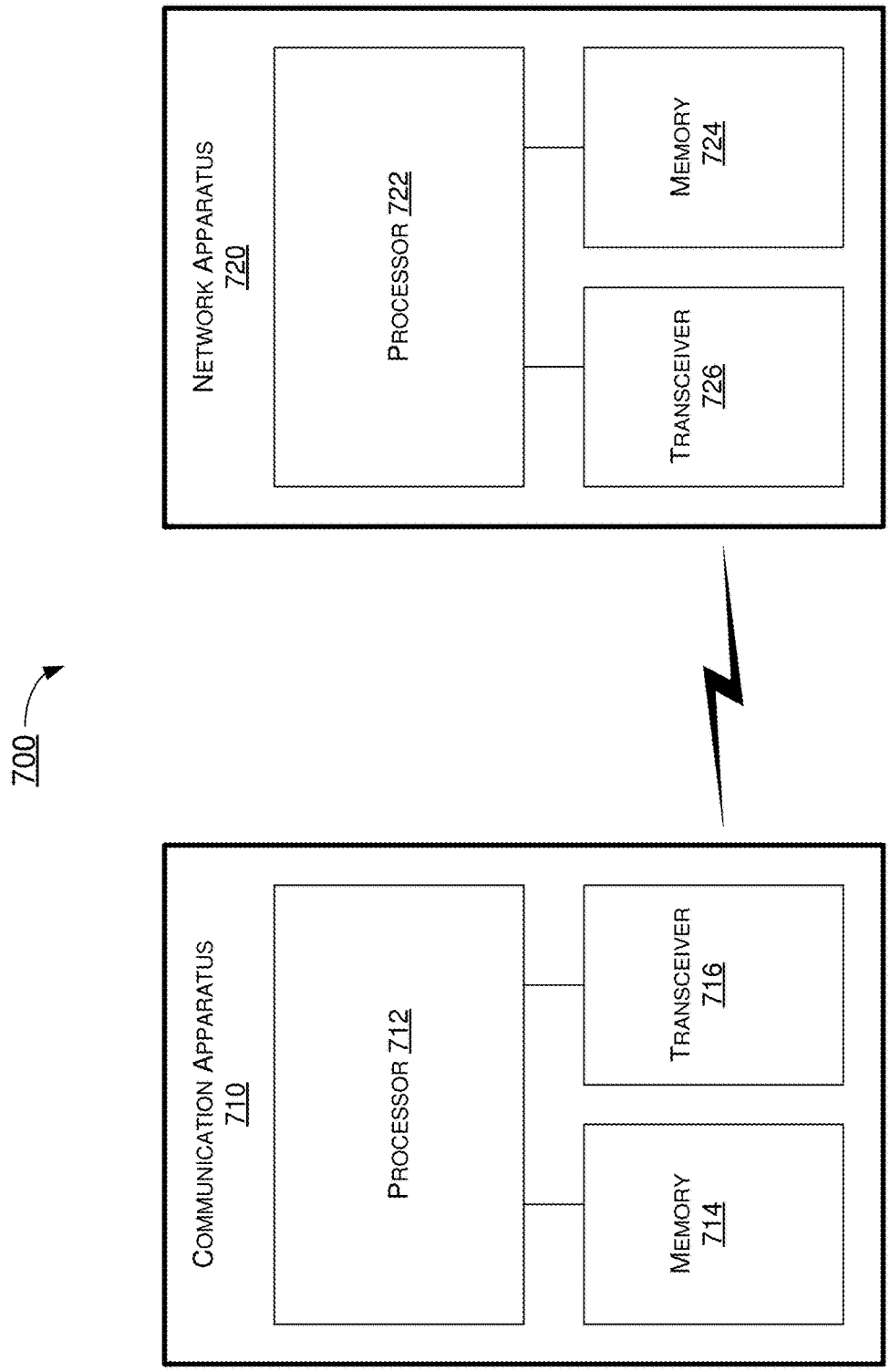
FIG. 7 is a block diagram of an example communication system in accordance with an implementation of the present disclosure.

FIG. 7 illustrates an example communication system 700 having an example communication apparatus 710 and an example network apparatus 720 in accordance with an implementation of the present disclosure. Each of communication apparatus 710 and network apparatus 720 may perform various functions to implement schemes, techniques, processes and methods described herein pertaining to TCP ACK rate reduction in mobile communications, including scenarios/schemes described above as well as processes described below.

Communication apparatus 710 may be a part of an electronic apparatus, which may be a UE such as a portable or mobile apparatus, a wearable apparatus, a wireless communication apparatus or a computing apparatus. For instance, communication apparatus 710 may be implemented in a smartphone, a smartwatch, a personal digital assistant, a digital camera, or a computing equipment such as a tablet computer, a laptop computer or a notebook computer. Communication apparatus 710 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 710 may be implemented in a smart thermostat, a smart fridge, a smart door lock, a wireless speaker or a home control center. Alternatively, communication apparatus 710 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 710 may include at least some of those components shown in FIG. 7 such as a processor 712, for example. Communication apparatus 710 may further include one or more other components not pertinent to the proposed scheme of the present disclosure (e.g., internal power supply, display device and/or user interface device), and, thus, such component(s) of communication apparatus 710 are neither shown in FIG. 7 nor described below in the interest of simplicity and brevity.

Network apparatus 720 may be a part of an electronic apparatus/station, which may be a network node such as a base station, a small cell, a router, a gateway or a satellite. For instance, network apparatus 720 may be implemented in an eNodeB in an LTE, in a gNB in a 5G, NR, IoT, NB-IoT, IIoT, or in a satellite in an NTN network. Alternatively, network apparatus 720 may be implemented in the form of one or more IC chips such as, for example and without limitation, one or more single-core processors, one or more multi-core processors, or one or more RISC or CISC processors. Network apparatus 720 may include at least some of those components shown in FIG. 7 such as a processor 722, for example. Network apparatus 720 may further include one or more other components not pertinent to the proposed scheme of the present disclosure (e.g., internal power supply, display device and/or user interface device), and, thus, such component(s) of network apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including power consumption reduction in a device (e.g., as represented by communication apparatus 710) and a network (e.g., as represented by network apparatus 720) in accordance with various implementations of the present disclosure.

In some implementations, communication apparatus 710 may also include a transceiver 716 coupled to processor 712 and capable of wirelessly transmitting and receiving data. In some implementations, communication apparatus 710 may further include a memory 714 coupled to processor 712 and capable of being accessed by processor 712 and storing data therein. In some implementations, network apparatus 720 may also include a transceiver 726 coupled to processor 722 and capable of wirelessly transmitting and receiving data. In some implementations, network apparatus 720 may further include a memory 724 coupled to processor 722 and capable of being accessed by processor 722 and storing data therein. Accordingly, communication apparatus 710 and network apparatus 720 may wirelessly communicate with each other via transceiver 716 and transceiver 726, respectively.

Each of communication apparatus 710 and network apparatus 720 may be a communication entity capable of communicating with each other using various proposed schemes in accordance with the present disclosure. To aid better understanding, the following description of the operations, functionalities and capabilities of each of communication apparatus 710 and network apparatus 720 is provided in the context of a mobile communication environment in which communication apparatus 710 is implemented in or as a communication apparatus or a UE (e.g., UE 110) and network apparatus 720 is implemented in or as a network node or base station (e.g., network node 125) of a communication network (e.g., wireless network 120). It is also noteworthy that, although the example implementations described below are provided in the context of mobile communications, the same may be implemented in other types of networks. It is noteworthy that, although the examples described below may be provided in the context of a communication apparatus 710 performing various operations related to compression and decompression under various proposed schemes in accordance with the present disclosure, the same may also be applicable to or otherwise implemented by network apparatus 720.

Under certain proposed schemes pertaining to TCP ACK rate reduction in mobile communications in accordance with the present disclosure, with communication apparatus 710 implemented in or as UE 110 and network apparatus 720 implemented in or as network node 125 in network environment 100, processor 712 of communication apparatus 710 may compress a plurality of source TCP ACKs into compressed TCP ACKs. Additionally, processor 712 may transmit, via transceiver 716, the compressed TCP ACKs in a PDCP data PDU to a receiver (e.g., apparatus 720 as network node 125).

In some implementations, in compressing the plurality of source TCP ACKs, processor 712 may identify, e.g., by a 5-tuple, the plurality of source TCP ACKs as being associated with a TCP data flow. For instance, the 5-tuple may include a sender address, a receiver address, a sender port number, a receiver port number, and a protocol.

In some implementations, in compressing the plurality of source TCP ACKs, processor 712 may perform certain operations. For instance, processor 712 may determine whether any of the plurality of source TCP ACKs contains an identifier to identify, among the plurality of source TCP ACKs, a first set of TCP ACKs containing no data and a second set of TCP ACKs containing data. Additionally, processor 712 may compress the first set of TCP ACKs. In such cases, in transmitting the compressed TCP ACKs, processor 712 may perform certain operations. For instance, processor 712 may transmit the compressed first set of TCP ACKs. Moreover, processor 712 may transmit the uncompressed second set of TCP ACKs before or after the transmitting of the compressed first set of TCP ACKs.

In some implementations, in compressing the plurality of source TCP ACKs, processor 712 may perform certain operations. For instance, processor 712 may identify, according to a flag in each of the plurality of source TCP ACKs, a first set of TCP ACKs each having the flag representing a first status and a second set of TCP ACKs each having the flag representing a second status. Moreover, processor 712 may compress the first set of TCP ACKs. In such cases, in transmitting the compressed TCP ACKs, processor 712 may perform certain operations. For instance, processor 712 may transmit the compressed first set of TCP ACKs. Furthermore, processor 712 may transmit the uncompressed second set of TCP ACKs before or after the transmitting of the compressed first set of TCP ACKs In some implementations, in compressing the plurality of source TCP ACKs, processor 712 may compress the plurality of source TCP ACKs except a first TCP ACK or a last TCP ACK among the plurality of source TCP ACKs. Additionally, processor 712 may also transmit, via transceiver 716, the uncompressed first TCP ACK or the uncompressed last TCP ACK to the receiver.

In some implementations, the compressed TCP ACKs may be represented by a descriptor format indicating at least one of the following: a number of the plurality of source TCP ACKs, a start ACK sequence number of the plurality of source TCP ACKs, a stop ACK sequence number of the plurality of source TCP ACKs, and a sequence number stride of the plurality of source TCP ACKs.

In some implementations, in compressing the plurality of source TCP ACKs, processor 712 may identify that each of the compressed TCP ACKs is compressed by setting a predetermined bit in a UDC header of each of the compressed TCP ACKs.

In some implementations, in compressing the plurality of source TCP ACKs, processor 712 may identify that each of the compressed TCP ACKs is compressed with a TCP ACK flow descriptor in an IPv4 header of each of the compressed TCP ACKs or in an option field of a TCP header of each of the compressed TCP ACKs.

In some implementations, in compressing the plurality of source TCP ACKs, processor 712 may identify that each of the compressed TCP ACKs is compressed with a TCP ACK flow descriptor in an IPv6 NH header of each of the compressed TCP ACKs.

Under certain proposed schemes pertaining to TCP ACK rate reduction in mobile communications in accordance with the present disclosure, with communication apparatus 710 implemented in or as UE 110 and network apparatus 720 implemented in or as network node 125 in network environment 100, processor 712 of communication apparatus 710 may receive, via transceiver 716, compressed TCP ACKs in a PDCP data PDU from a transmitter (e.g., apparatus 720 as network node 125). Additionally, processor 712 may decompress the compressed TCP ACKs into a plurality of target TCP ACKs.

In some implementations, the compressed TCP ACKs may be represented by a descriptor format indicating a number of the plurality of target TCP ACKs, a start ACK sequence number of the plurality of target TCP ACKs, a stop ACK sequence number of the plurality of target TCP ACKs, and a sequence number stride of the plurality of target TCP ACKs. In such cases, in decompressing the compression descriptor, processor 712 may generate the plurality of target TCP ACKs according to a template ACK and the information indicated by the descriptor.

In some implementations, the plurality of target TCP ACKs may be identified by a 5-tuple as being associated with a TCP data flow. For instance, the 5-tuple may include a sender address, a receiver address, a sender port number, a receiver port number, and a protocol.

In some implementations, each of the compressed TCP ACKs may be identified as being compressed by a predetermined bit in a UDC header of each of the compressed TCP ACKs.

In some implementations, each of the compressed TCP ACKs may be identified as being compressed with a TCP ACK flow descriptor in an IPv4 header of each of the compressed TCP ACKs or in an option field of a TCP header of each of the compressed TCP ACKs.

Illustrative Processes

Figure 8:
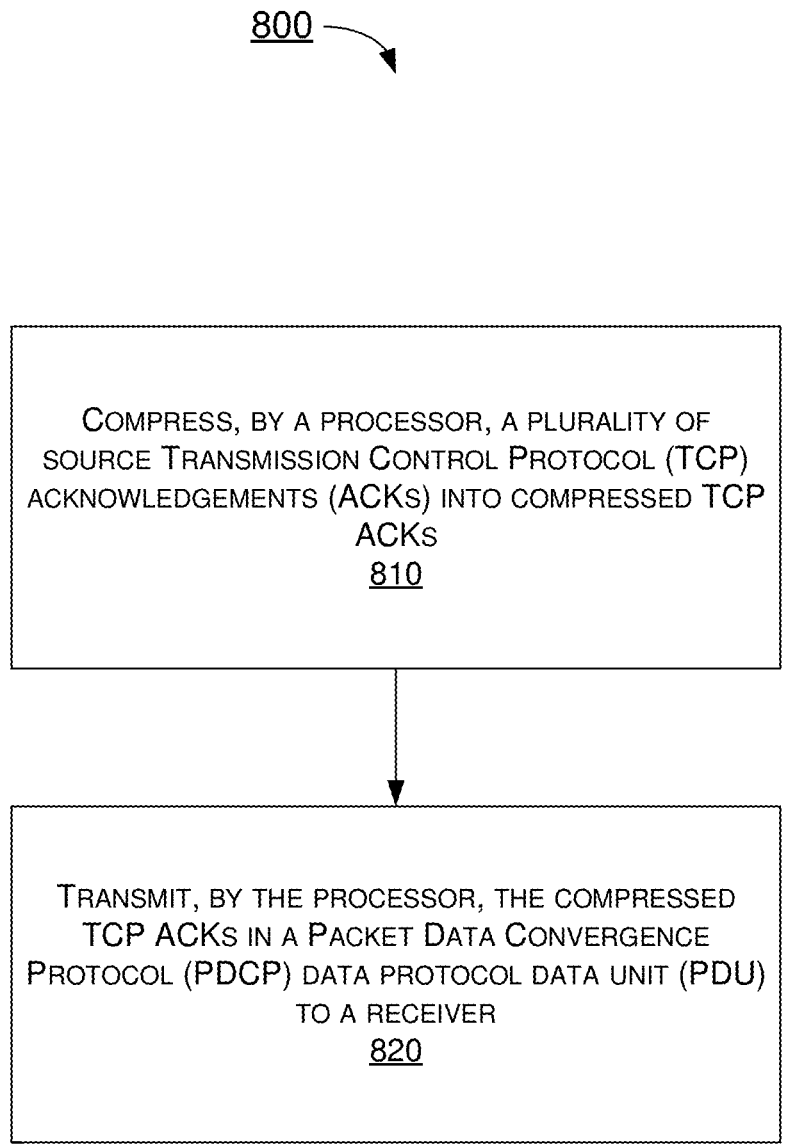
FIG. 8 is a flowchart of an example process in accordance with an implementation of the present disclosure.

FIG. 8 illustrates an example process 800 in accordance with an implementation of the present disclosure. Process 800 may be an example implementation of schemes described above whether partially or completely, with respect to TCP ACK rate reduction in mobile communications in accordance with the present disclosure. Process 800 may represent an aspect of implementation of features of communication apparatus 710 and network apparatus 720. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order. Process 800 may be implemented by communication apparatus 710 or any suitable UE or machine type devices. Solely for illustrative purposes and without limitation, process 800 is described below in the context of communication apparatus 710 and network apparatus 720. Process 800 may begin at block 810.

At 810, process 800 may involve processor 712 of communication apparatus 710, implemented in or as UE 110, compressing a plurality of source TCP ACKs into compressed TCP ACKs. Process 800 may proceed from 810 to 820.

At 820, process 800 may involve processor 712 transmitting, via transceiver 716, the compressed TCP ACKs in a PDCP data PDU to a receiver (e.g., apparatus 720 as network node 125).

In some implementations, in compressing the plurality of source TCP ACKs, process 800 may involve processor 712 identifying, e.g., by a 5-tuple, the plurality of source TCP ACKs as being associated with a TCP data flow. For instance, the 5-tuple may include a sender address, a receiver address, a sender port number, a receiver port number, and a protocol.

In some implementations, in compressing the plurality of source TCP ACKs, process 800 may involve processor 712 performing certain operations. For instance, process 800 may involve processor 712 determining whether any of the plurality of source TCP ACKs contains an identifier to identify, among the plurality of source TCP ACKs, a first set of TCP ACKs containing no data and a second set of TCP ACKs containing data. Additionally, process 800 may involve processor 712 compressing the first set of TCP ACKs. In such cases, in transmitting the compressed TCP ACKs, process 800 may involve processor 712 performing certain operations. For instance, process 800 may involve processor 712 transmitting the compressed first set of TCP ACKs. Moreover, process 800 may involve processor 712 transmitting the uncompressed second set of TCP ACKs before or after the transmitting of the compressed first set of TCP ACKs.

In some implementations, in compressing the plurality of source TCP ACKs, process 800 may involve processor 712 performing certain operations. For instance, process 800 may involve processor 712 identifying, according to a flag in each of the plurality of source TCP ACKs, a first set of TCP ACKs each having the flag representing a first status and a second set of TCP ACKs each having the flag representing a second status. Moreover, process 800 may involve processor 712 compressing the first set of TCP ACKs. In such cases, in transmitting the compressed TCP ACKs, process 800 may involve processor 712 performing certain operations. For instance, process 800 may involve processor 712 transmitting the compressed first set of TCP ACKs. Furthermore, process 800 may involve processor 712 transmitting the uncompressed second set of TCP ACKs before or after the transmitting of the compressed first set of TCP ACKs In some implementations, in compressing the plurality of source TCP ACKs, process 800 may involve processor 712 compressing the plurality of source TCP ACKs except a first TCP ACK or a last TCP ACK among the plurality of source TCP ACKs. Additionally, process 800 may further involve processor 712 transmitting, via transceiver 716, the uncompressed first TCP ACK or the uncompressed last TCP ACK to the receiver.

In some implementations, the compressed TCP ACKs may be represented by a descriptor format indicating at least one of the following: a number of the plurality of source TCP ACKs, a start ACK sequence number of the plurality of source TCP ACKs, a stop ACK sequence number of the plurality of source TCP ACKs, and a sequence number stride of the plurality of source TCP ACKs.

In some implementations, in compressing the plurality of source TCP ACKs, process 800 may involve processor 712 identifying that each of the compressed TCP ACKs is compressed by setting a predetermined bit in a UDC header of each of the compressed TCP ACKs.

In some implementations, in compressing the plurality of source TCP ACKs, process 800 may involve processor 712 identifying that each of the compressed TCP ACKs is compressed with a TCP ACK flow descriptor in an IPv4 header of each of the compressed TCP ACKs or in an option field of a TCP header of each of the compressed TCP ACKs.

In some implementations, in compressing the plurality of source TCP ACKs, process 800 may involve processor 712 identifying that each of the compressed TCP ACKs is compressed with a TCP ACK flow descriptor in an IPv6 NH header of each of the compressed TCP ACKs.

Figure 9:
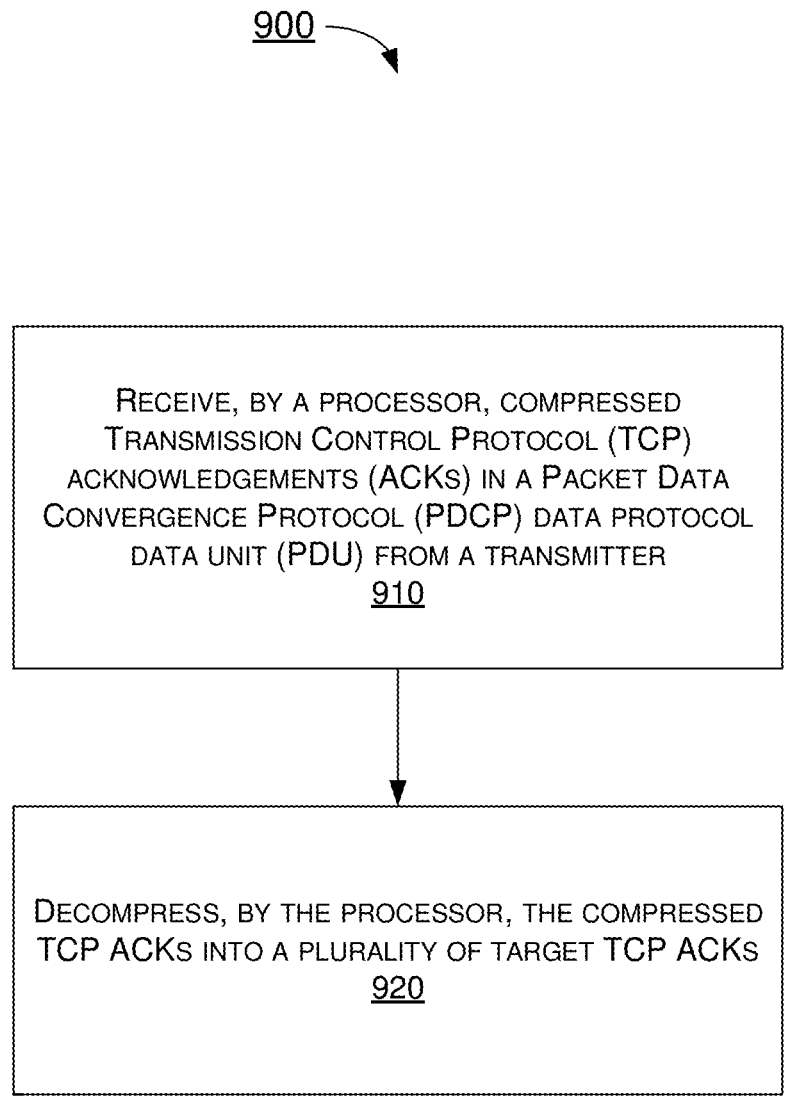
FIG. 9 is a flowchart of an example process in accordance with an implementation of the present disclosure.

FIG. 9 illustrates an example process 900 in accordance with an implementation of the present disclosure. Process 900 may be an example implementation of schemes described above whether partially or completely, with respect to TCP ACK rate reduction in mobile communications in accordance with the present disclosure. Process 900 may represent an aspect of implementation of features of communication apparatus 710 and network apparatus 720. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 710 or any suitable UE or machine type devices. Solely for illustrative purposes and without limitation, process 900 is described below in the context of communication apparatus 710 and network apparatus 720. Process 900 may begin at block 910.

At 910, process 900 may involve processor 712 of communication apparatus 710, implemented in or as UE 110, receiving, via transceiver 716, compressed TCP ACKs in a PDCP data PDU from a transmitter (e.g., apparatus 720 as network node 125). Process 900 may proceed from 910 to 920.

At 920, process 900 may involve processor 712 decompressing the compressed TCP ACKs into a plurality of target TCP ACKs.

In some implementations, the compressed TCP ACKs may be represented by a descriptor format indicating a number of the plurality of target TCP ACKs, a start ACK sequence number of the plurality of target TCP ACKs, a stop ACK sequence number of the plurality of target TCP ACKs, and a sequence number stride of the plurality of target TCP ACKs. In such cases, in decompressing the compression descriptor, process 900 may involve processor 712 generating the plurality of target TCP ACKs according to a template ACK and the information indicated by the descriptor.

In some implementations, the plurality of target TCP ACKs may be identified by a 5-tuple as being associated with a TCP data flow. For instance, the 5-tuple may include a sender address, a receiver address, a sender port number, a receiver port number, and a protocol.

In some implementations, each of the compressed TCP ACKs may be identified as being compressed by a predetermined bit in a UDC header of each of the compressed TCP ACKs.

In some implementations, each of the compressed TCP ACKs may be identified as being compressed with a TCP ACK flow descriptor in an IPv4 header of each of the compressed TCP ACKs or in an option field of a TCP header of each of the compressed TCP ACKs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:
determining whether any of a plurality of source Transmission Control Protocol (TCP) acknowledgements (ACKs) contains an identifier to identify, among the plurality of source TCP ACKs, a first set of TCP ACKs containing no data and a second set of TCP ACKs containing data;
compressing, by a processor, a plurality of source TCP ACKs into compressed TCP ACKs, wherein the compressing of the plurality of source TCP ACKs comprises identifying, according to a flag in each of the plurality of source TCP ACKs, the first set of TCP ACKs each having the flag representing a first status and the second set of TCP ACKs each having the flag representing a second status, wherein the compressing of the plurality of source TCP ACKs comprises compressing the first set of TCP ACKs;
transmitting, by the processor, the compressed TCP ACKs in a Packet Data Convergence Protocol (PDCP) data protocol data unit (PDU) to a receiver, wherein the transmitting of the compressed TCP ACKs comprises transmitting the compressed first set of TCP ACKs; and
transmitting the uncompressed second set of TCP ACKs before or after the transmitting of the compressed first set of TCP ACKs.

2. The method of claim 1, wherein the compressing of the plurality of source TCP ACKs comprises identifying the plurality of source TCP ACKs as being associated with a TCP data flow.

3. The method of claim 1, wherein the compressing of the plurality of source TCP ACKs comprises compressing the plurality of source TCP ACKs except a first TCP ACK or a last TCP ACK among the plurality of source TCP ACKs, and wherein the method further comprises transmitting the uncompressed first TCP ACK or the uncompressed last TCP ACK to the receiver.

4. The method of claim 1, wherein the compressed TCP ACKs are represented by a descriptor format indicating at least one of a number of the plurality of source TCP ACKs, a start ACK sequence number of the plurality of source TCP ACKs, a stop ACK sequence number of the plurality of source TCP ACKs, and a sequence number stride of the plurality of source TCP ACKs.

5. The method of claim 1, wherein the compressing of the plurality of source TCP ACKs comprises identifying that each of the compressed TCP ACKs is compressed by setting a predetermined bit in a uplink data compression (UDC) header of each of the compressed TCP ACKs.

6. The method of claim 1, wherein the compressing of the plurality of source TCP ACKs comprises identifying that each of the compressed TCP ACKs is compressed with a TCP ACK flow descriptor in an Internet Protocol version 4 (IPv4) header of each of the compressed TCP ACKs or in an option field of a TCP header of each of the compressed TCP ACKs.

7. The method of claim 1, wherein the compressing of the plurality of source TCP ACKs comprises identifying that each of the compressed TCP ACKs is compressed with a TCP ACK flow descriptor in an Internet Protocol version 6 (IPv6) next hop (NH) header of each of the compressed TCP ACKs.

8. A method, comprising:
receiving, by a processor, a compressed first set of Transmission Control Protocol (TCP) acknowledgements (ACKs) in a Packet Data Convergence Protocol (PDCP) data protocol data unit (PDU) from a transmitter;
receiving, by the processor, an uncompressed second set of TCP ACKs before or after the receiving of the compressed first set of TCP ACKs; and
decompressing, by the processor, the compressed TCP ACKs into a plurality of target TCP ACKs,
wherein the compressed first set of TCP ACKs and the uncompressed second set of TCP ACKs are based on a determination of whether any of a plurality of source TCP ACKs contains an identifier to identify, among the plurality of source TCP ACKs, the first set of TCP ACKs containing no data and the second set of TCP ACKs containing data, and wherein compressing the plurality of source TCP ACKs is based on an identification of a flag, in each of the plurality of source TCP ACKs, of the first set of TCP ACKs each having the flag representing a first status and the second set of TCP ACKs each having the flag representing a second status.

9. The method of claim 8, wherein the compressed TCP ACKs are represented by a descriptor format indicating a number of the plurality of target TCP ACKs, a start ACK sequence number of the plurality of target TCP ACKs, a stop ACK sequence number of the plurality of target TCP ACKs, and a sequence number stride of the plurality of target TCP ACKs, and wherein the decompressing of the compression descriptor comprises generating the plurality of target TCP ACKs according to a template ACK and the information indicated by the descriptor.

10. The method of claim 8, wherein the plurality of target TCP ACKs are identified by a 5-tuple as being associated with a TCP data flow, and wherein the 5-tuple comprises a sender address, a receiver address, a sender port number, a receiver port number, and a protocol.

11. The method of claim 8, wherein each of the compressed TCP ACKs is identified as being compressed by a predetermined bit in a uplink data compression (UDC) header of each of the compressed TCP ACKs.

12. The method of claim 8, wherein each of the compressed TCP ACKs is identified as being compressed with a TCP ACK flow descriptor in an Internet Protocol version 4 (IPv4) header of each of the compressed TCP ACKs or in an option field of a TCP header of each of the compressed TCP ACKs.

13. An apparatus implementable in a user equipment (UE), comprising:
a transceiver configured to wirelessly communicate with a network; and
a processor coupled to the transceiver and configured to perform operations comprising:
determining whether any of a plurality of source Transmission Control Protocol (TCP) acknowledgements (ACKs) contains an identifier to identify, among the plurality of source TCP ACKs, a first set of TCP ACKs containing no data and a second set of TCP ACKs containing data;
compressing a plurality of source TCP ACKs into compressed TCP ACKs, wherein the compressing of the plurality of source TCP ACKs comprises identifying, according to a flag in each of the plurality of source TCP ACKs, the first set of TCP ACKs each having the flag representing a first status and the second set of TCP ACKs each having the flag representing a second status, wherein the compressing of the plurality of source TCP ACKs comprises compressing the first set of TCP ACKs;
transmitting, via the transceiver, the compressed TCP ACKs in a Packet Data Convergence Protocol (PDCP) data protocol data unit (PDU) to a receiver, wherein the transmitting of the compressed TCP ACKs comprises transmitting the compressed first set of TCP ACKs; and
transmitting the uncompressed second set of TCP ACKs before or after the transmitting of the compressed first set of TCP ACKs.

14. The apparatus of claim 13, wherein, in compressing the plurality of source TCP ACKs, the processor identifies the plurality of source TCP ACKs as being associated with a TCP data flow by using a 5-tuple, and wherein the 5-tuple comprises a sender address, a receiver address, a sender port number, a receiver port number, and a protocol.

15. The apparatus of claim 13, wherein, in compressing the plurality of consecutive TCP ACKs, the processor performs operations comprising:
compressing the first set of TCP ACKs without compressing the second set of TCP ACKs; and
forwarding the first set of TCP ACKs in compression buffer before the second set of TCP ACKs.

16. The apparatus of claim 13, wherein, in compressing the plurality of source TCP ACKs, the processor compresses the plurality of source TCP ACKs except a first TCP ACK or a last TCP ACK among the plurality of source TCP ACKs, and wherein the processor further transmits the uncompressed first TCP ACK or the uncompressed last TCP ACK to the receiver.

* * * * *